Patented Apr. 1, 1947

2,418,374

UNITED STATES PATENT OFFICE 2,418,374

PROCESS FOR THE PRODUCTION OF ALKADIENES

Charles M. Stone, Beacon, N. Y., assignor to The Texas Company, New York, N. Y., a corporation of Delaware No Drawing. Application November 20, 1943, Serial No. 511,169

4 Claims. (Cl. 260—680)

My invention relates to the manufacture of dienes from unsaturated hydrocarbons, and particularly to an improved process for the manufacture of 1,3-butadiene and other conjugated alkadienes from normally gaseous olefins.

Alkadienes have been produced by the dehydrogenation of olefins or olefinic hydrocarbon fractions, but the conversions and over-all yields have been very low. Considerably improved conversions have been obtained by the use of sulfur trioxide as a hydrogen acceptor in the dehydrogenation of olefins at high temperatures, but the over-all yields have been low. These low yields have apparently been due to extensive cracking, in view of the high temperatures employed. Attempts to minimize cracking by operating at temperatures of 700 to 800° F. and employing an active dehydrogenation catalyst have been unsuccessful, both the conversions and over-all yields of dienes being low. It has therefore been proposed that the dehydrogenation with sulfur trioxide as a hydrogen acceptor be carried out in the presence of an extensive surface contact material which is not a dehydrogenation catalyst, and at temperatures intermediate between those previously suggested for catalytic and for thermal dehydrogenations. This procedure results in improved conversions, but the over-all yields which have been obtained are not as high as desirable for commercial operation.

I have now discovered that further improvement in conversion, together with a much higher over-all yield, may be obtained by the use of dehydrogenation catalysts if the reaction conditions are controlled as described herein. I have found that instead of attempting to suppress cracking by catalytically dehydrogenating at a low temperature, a high temperature is required to obtain a rate of catalytic dehydrogenation substantially exceeding the combined rates of thermal and catalytic cracking of both the charge hydrocarbons and the dehydrogenation products.

Any dehydrogenation catalyst may be employed in my process, but the most desirable types are those having a high temperature coefficient for the velocity of the catalytic dehydrogenation reaction. However, it will be apparent to those skilled in the art that dehydrogenation catalysts which are known to be poisoned by sulfur compounds should not be chosen for use in conjunction with sulfur trioxide. Catalysts of the types employed for the dehydrogenation of paraffinic and naphthenic hydrocarbons are generally very suitable for use in the present process. A preferred class of catalysts comprises difficultly reducible oxygen and sulfur compounds of metals and metalloids, especially the metals and metalloids of groups II, III, and IV of the periodic system. Examples of the latter class are alumina, silica, molybdena, molybdenum sulfide, and copper sulfate. Mixed catalysts may be used, and the catalysts may be mixed with or adsorbed on inert supporting materials. Examples of suitable mixed catalysts are coprecipitated silica-alumina, and copper sulfate adsorbed on alumina. I generally prefer to use a catalyst comprising essentially a difficultly reducible metal oxide. Activated Alumina is an outstanding catalyst of this type.

The conditions for the dehydrogenation reaction may generally be the same as those previously proposed for the non-dehydrogenating contact materials, provided the temperature and contact time are correlated to effect preferential dehydrogenation with the particular dehydrogenating catalyst chosen for use in the present process.

The reaction pressure should be relatively low, and is suitably such that the sum of the partial pressures of the reactants is substantially less than one atmosphere. Partial pressures of the total reactants ranging from about 0.01 atm. to about 0.85 atm. will generally be satisfactory, and pressures of 0.2 atm. to 0.6 atm. are usually preferred.

The reduced partial pressures of the total reactants may be effected by employing a subatmospheric total pressure, or by incorporating a diluent in the reaction mixture, the latter procedure being preferred. Any diluent may be used which is inert or has no deleterious effect on the reactants, reaction products, or catalyst under the conditions employed. Hydrogen or methane, or mixtures of those gases, may serve as diluents which tend to inhibit further oxidation of the dienes produced in the primary dehydrogenation reaction. Nitrogen is a very satisfactory diluent, and other inert gases or mixtures such as gaseous combustion products may also be used. The diluent may comprise a normally liquid compound, the vapors of which are stable and inert under the reaction conditions. Water is a very satisfactory diluent which may be charged separately as steam, or may be introduced in the form of water of hydration of either of the reactants. Thus, the olefin may be introduced as the corresponding alcohol, sulfur trioxide may be introduced in the form of sulfuric acid, or both may be introduced in the form of an ester. The following are representative charge stocks including water as the diluent:

*Premixed charge stocks*

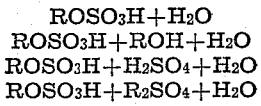

$ROSO_3H+H_2O$
$ROSO_3H+ROH+H_2O$
$ROSO_3H+H_2SO_4+H_2O$
$ROSO_3H+R_2SO_4+H_2O$

*Charge of separate constituents*

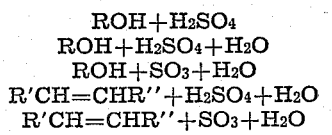

$ROH+H_2SO_4$
$ROH+H_2SO_4+H_2O$
$ROH+SO_3+H_2O$
$R'CH=CHR''+H_2SO_4+H_2O$
$R'CH=CHR''+SO_3+H_2O$

If the sulfur trioxide is employed in the form of sulfuric acid, such acid may be aqueous, anhydrous, or fuming, depending upon the amount of diluent desired in the reaction mixture. Relatively pure acid is desirable when the process is to be operated for the production of a single diene from a relatively pure olefin. However, the sulfuric acid may contain considerable impurities without interfering with its operation in my process, and various types of recovered acid may be used, such as petroleum refinery black acids, sludge acids or other spent acids such as spent alkylation acids. When employing an acid of the latter type, containing considerable amounts of organic matter, the unsaturated hydrocarbon content of the acid may also contribute to the production of dienes.

The relative proportions of the reactants and diluents may vary over a comparatively wide range. Usually, however, mol ratios of sulfur trioxide to olefin ranging from 0.1/1.0 to 5.0/1 will be most satisfactory, and I generally prefer to use ratios of 0.5/1 to 2/1. The mol ratio of diluent to olefin may suitably range from 1/1 to 10/1, but is preferably 2/1 to 5/1.

As has previously been indicated, the time-temperature conditions for the reaction should be chosen to minimize cracking or other decomposition reactions. The temperature should be sufficiently high that the rate of catalytic dehydrogenation substantially exceeds the combined rates of thermal and catalytic cracking of both the olefinic charge hydrocarbons and the alkadienes produced. Temperatures of 800 to 1300° F. will generally be satisfactory for catalysts comprising difficultly reducible metal compounds of oxygen or sulfur. With these catalysts I usually prefer to use temperatures of 900 to 1200° F. The higher temperatures, e. g., 1200 to 1300° F., are best adapted for charge stocks containing sulfuric esters. Temperatures of the order of 900 to 1100° F. appear to be most satisfactory for separately charging an olefin, sulfur trioxide, and water.

The contact time should be sufficiently short that the reactions are terminated before the conversion of the charged olefinic hydrocarbons to cracked products exceeds the conversion to alkadienes. Preferably, the contact time is as short as possible, consistent with a practical conversion of the olefinic hydrocarbons to alkadienes. In any case, the contact time should be only a matter of a fraction of a second to a few seconds, but the optimum value will vary to some extent, depending upon the temperature and the particular catalyst employed. With metal oxide or sulfide catalysts at temperatures of 800 to 1300° F., contact times of 0.1 to 2.0 seconds will generally be satisfactory, and I prefer in such cases to use contact times of 0.3 to 0.6 second. Within these ranges the shorter contact times are preferably employed at the higher reaction temperatures, and the longer contact times at the lower reaction temperatures.

The reaction vessel may be of any of the types used for high temperature gas reactions, such as those employed for cracking or dehydrogenating petroleum hydrocarbons. Cracking reactors designed for contacting the charge gas with hot combustion gases may be used, in which case the hot combustion gases will not only provide the heat for the process but will also serve as diluents. Cracking reactors of the pipe furnace type may be used, or preheaters of this type may be employed in conjunction with a larger reaction vessel. Powdered catalysts may be used with apparatus adapted for "fluid catalyst" operation. For fixed bed operation, the reaction vessel is charged with a catalyst which is suitably in the form of pellets, Raschig rings, or other forms providing an extensive contact surface. Single or multiple catalyst beds may be used, and the usual expedients may be employed to prevent channeling and to obtain adequate contact and uniform conditions. If desired, the first portion of the reaction vessel may serve as the preheater, in which case it may suitably be filled with inert packing rather than with catalyst. When employing normally liquid charge stocks, such as sulfuric acid or esters, it is often advantageous to spray the liquid into a flash vaporizer or combined vaporizer and preheater. Prolonged heating in the liquid state is usually disadvantageous from the standpoint of increased corrosion and coke formation.

The usual operating expedients for high temperature reactions and for diene production may be employed when using my charge mixtures. For example, it is desirable to quench the reaction products immediately on leaving the reaction zone in order to minimize decomposition of the dienes produced. The recovery of the dienes and unreacted charged hydrocarbons from the reacted mixture may also be effected in accordance with prior practices in similar processes. Such recovery systems, however, are preferably modified to enable sulfur dioxide or other reduction products of the sulfur trioxide to be recovered and reoxidized for recycling. Sulfur and hydrogen sulfide may be separated and burned to produce sulfur dioxide. Air may be used for the combustion to provide a nitrogenous diluent for the dehydrogenation charge mixture. The sulfur dioxide produced from the sulfur and hydrogen sulfide, together with that separated from the dehydrogenation reaction products, may be oxidized to sulfur trioxide by conventional methods.

My process will be further illustrated by the following specific example:

*Example*

A stainless steel reaction vessel packed with Activated Alumina ("Alorco A") was employed for the pyrolysis of a mixture of sulfuric acid and butene-2, separately charged to the reactor. The first portion of the reaction vessel was utilized as a preheater and vaporizer for the sulfuric acid, and the butene-2 was introduced between this portion and the remainder of the vessel which served as the reactor proper. Butene-2 and sulfuric acid of approximately 92.3% titratable acidity were charged at rates corresponding to a mol ratio $C_4H_8/SO_3/H_2O$ of about 1.00/0.97/1.49. The average maximum reactor temperature during the run was about 970° F. and the contact time in the reaction zone was approximately 0.4 second (based on the total volume of butene, sulfur trioxide, and water, at the average maximum reaction temperature, calculated in accordance with the ideal gas laws). In single pass operation, the yield of butadiene was initially 10.8% of the theoretical, increasing to 24.9% of the theoretical yield after the first hour's operation. The recovery of unreacted butene fraction for recycling was 41.8% of the original charge during the first hour and 70.7% thereafter. On the basis of these butene recoveries, the over-all yield obtainable in cyclic operation amounted to about 18.6% of the theoretical yield during the first hour and about 85.0% thereafter. These results indicate that the preferential dehydrogenation activity of the catalysts employed in my process is improved by an initial conditioning or activating period.

It is to be understood, of course, that the above example is merely illustrative and does not limit the scope of my invention. Other charge hydrocarbons and other diluents may be substituted for the particular materials used in the example, and the operating conditions may also be modified in accordance with the foregoing description. In general, it may be said that the use of any equivalents or modifications of procedure which would naturally occur to those skilled in the art is included in the scope of my invention. Only such limitations should be imposed on the scope of this invention as are indicated in the appended claims.

I claim:
1. A process for the production of an alkadiene which comprises subjecting a reaction mixture comprising a mono-olefinic hydrocarbon, sulfur trioxide and an inert diluent which is gaseous at the reaction temperature to contact with a catalyst comprising copper sulfate adsorbed on alumina at a pressure such that the sum of the partial pressures of said mono-olefinic hydrocarbon and said sulfur trioxide is substantitally below atmospheric pressure and at a temperature ranging from about 800° F. to about 1300° F. for a short period to convert said mono-olefinic hydrocarbon to an alkadiene while avoiding substantial cracking.

2. A process for the production of an alkadiene which comprises introducing a mono-olefinic hydrocarbon and sulfuric acid into a reaction zone maintained at temperatures ranging from about 800° F. to about 1300° F. and in contact with a catalyst comprising copper sulfate adsorbed on alumina for a short period to convert said olefinic hydrocarbon to an alkadiene while avoiding substantial cracking.

3. A process for the production of an alkadiene which comprises subjecting a reaction mixture comprising a normally gaseous olefin and at least 0.1 mol of sulfur trioxide per mol of said normally gaseous olefin and an added diluent which is gaseous at the reaction temperature to contact with a catalyst comprising copper sulfate adsorbed on alumina at a pressure such that the sum of the partial pressures of said normally gaseous olefin and said sulfur trioxide is below about 0.85 atmospheres and at a temperature ranging from about 800° F. to about 1300° F. for a period of time ranging from about 2.0 seconds to 0.1 second to convert said normally gaseous olefin to an alkadiene while avoiding substantial cracking.

4. A process for the production of an alkadiene which comprises subjecting a reaction mixture comprising a monoolefinic hydrocarbon, sulfur trioxide and steam to contact with a catalyst theoretical yield after the first hour's operation. at a pressure such that the sum of the partial pressures of said mono-olefinic hydrocarbon and said sulfur trioxide is substantially below atmospheric pressure at a temperature ranging from about 800° F. to about 1300° F. for a short period to convert said mono-olefinic hydrocarbon to an alkadiene while avoiding substantial cracking.

CHARLES M. STONE.

REFERENCES CITED

The following references are of record in the file of this patent:

UNITED STATES PATENTS

| Number | Name | Date |
|---|---|---|
| 2,126,817 | Rosen | Aug. 16, 1938 |
| 2,265,641 | Grosskinsky | Dec. 9, 1941 |
| 215,756 | Kirk | May 27, 1879 |
| 1,935,161 | Morrell | Nov. 14, 1933 |

Certificate of Correction

Patent No. 2,418,374.

April 1, 1947.

CHARLES M. STONE

It is hereby certified that error appears in the printed specification of the above numbered patent requiring correction as follows: Column 6, line 33, claim 4, strike out the words and period "theoretical yield after the first hour's operation." and insert instead *comprising copper sulfate adsorbed on alumina*; and that the said Letters Patent should be read with this correction therein that the same may conform to the record of the case in the Patent Office.

Signed and sealed this 20th day of May, A. D. 1947.

[SEAL]

LESLIE FRAZER,
*First Assistant Commissioner of Patents.*